United States Patent [19]
Tai

[11] Patent Number: 4,908,761
[45] Date of Patent: Mar. 13, 1990

[54] SYSTEM FOR IDENTIFYING HEAVY PRODUCT PURCHASERS WHO REGULARLY USE MANUFACTURERS' PURCHASE INCENTIVES AND PREDICTING CONSUMER PROMOTIONAL BEHAVIOR RESPONSE PATTERNS

[75] Inventor: Roland Tai, Yorktown Heights, N.Y.
[73] Assignee: Innovare Resourceful Marketing Group, Inc., Yorktown Heights, N.Y.
[21] Appl. No.: 245,818
[22] Filed: Sep. 16, 1988
[51] Int. Cl.[4] ............................................. G06F 15/40
[52] U.S. Cl. .................................. 364/401; 364/402; 235/376; 235/383
[58] Field of Search ....................... 364/401, 402, 405; 235/376, 383, 381

[56] References Cited

U.S. PATENT DOCUMENTS

| | | | |
|---|---|---|---|
| 4,355,372 | 10/1982 | Johnson et al. | 364/900 |
| 4,554,446 | 11/1985 | Murphy et al. | 235/487 |
| 4,723,212 | 2/1988 | Mindrum et al. | 364/401 |

OTHER PUBLICATIONS

E. Larson, "They're Making a List–Data Companies and the Pigeonholing of America", Washington Post Style Section, Jul. 27, 1989.
"Target Marketing System", sales brochure, Vision National Descision Systems.

*Primary Examiner*—Jerry Smith
*Assistant Examiner*—Steven G. Kibby
*Attorney, Agent, or Firm*—Collard, Roe & Galgano

[57] ABSTRACT

There is provided a system and methodology for identifying the heaviest product purchasers who regularly use coupons and determining their promotional behavior response patterns of which involves initially preparing a list of names and addresses of consumers who are the most likely heaviest product purchasers who are regular coupon users and then delivering to them a plurality of product purchase incentives such as cents off coupons. The delivery of the coupons to the selected consumer households would also include at least one and preferably a plurality of consumer activated encoding devices each of which being designed to be attached to a coupon. The at least one consumer activated encoding device delivered to each consumer includes the name and address of the receiving consumer in machine readable language. Those coupons having the attached encoding devices are received for redemption like other coupons, however, the names and addresses of the consumers submitting the encoded coupons received for redemption are read and recorded and a refined list of consumer names and addresses that actually redeem cents-off coupons is created from the initial prepared list of consumers. Additionally, by including machine readable data relative to the product, such as size, price, etc., on every coupon and by periodically delivering additional coupons and consumer-activated encoding devices to the refined list of consumer names and addresses and analyzing the redemption characteristics of the various coupons, the consumer promotional behavior response can be determined and thus consumer promotional behaviour response patterns can be predicted with a high degree of accuracy.

26 Claims, 4 Drawing Sheets

SYSTEM FOR IDENTIFYING HEAVY PRODUCT PURCHASERS WHO REGULARLY USE MANUFACTURERS' PURCHASE INCENTIVES AND PREDICTING CONSUMER PROMOTIONAL BEHAVIOR RESPONSE PATTERNS

The present invention relates generally to a system and methodology for determining or identifying the heaviest product purchasers who regularly use coupons and it also relates to a system and methodology for determining patterns of consumer promotional behavior response so that such patterns can be predicted with a high degree of accuracy.

BACKGROUND OF THE INVENTION

The familiar "cents-off" coupon is issued by a manufacturer as a purchase incentive in order to induce a consumer to purchase that manufacturer's product as opposed to the similar product of another manufacturer. Because of its sheer size and the proliferation of duplicative products, coupon usage is greatest in the mass marketed consumer product industry. Obviously, in order for a cents-off coupon to have its intended effect it must be delivered to a consumer who will use it to purchase the intended product. At the present time, coupon distribution is limited to in-store delivery, on-product delivery, magazine delivery, newspaper delivery and direct mail. These delivery methods are designed to blanket the middle class in and around metropolitan areas and were instrumental to the introduction and growth of the 10,000 familiar brand name products on mass retail store shelves today. Both the in-store coupon and the on-product coupon are utilized by consumers who have already formed the intention of purchasing the particular product and therefore such coupons are of little or no benefit in the development of incremental business and further are not adaptable to carrying advertising messages. Magazine delivery of coupons is relatively expensive and suffers from limited audience reach and flexibility in terms of market selectivity. Newspapers deliver a large number of coupons between daily and Sunday editions. Sunday newspaper inserts, with their excellent graphic reproduction and broad-scale reach, far outstrip daily papers in this type of coupon delivery. Finally, there is the direct mail delivery of coupons which delivers a relatively small number of coupons but has a relatively high redemption rate because of its targeted delivery.

Targeted direct mail coupon delivery results in the highest redemption rate amongst all other methods of delivery essentially because the targeted audience is more specifically chosen to be more receptive to the promotional offer than would a mass audience. The most successful direct mail coupon delivery is performed by Donnelley Marketing, a division of Dun & Bradstreet Corporation, through its Carol Wright program. The system utilized by Donnelley Marketing involves the compilation of a list of households derived from various sources, such as telephone directories, auto registrations, etc. to result in a compiled list of approximately seventy-seven million household names and addresses. By utilizing demographics based on household size, homemaker's age, household income and the number of children under eighteen years of age, this compiled list is merged and purged to result in a mailing list of thirty-seven million names and addresses of households having the requisite buying power for high usage potential of all consumer products. This mailing list is then utilized in the Donnelley Marketing-Carol Wright program to periodically mail packages containing a number of coupons and other consumer promotional material and offers.

Although this direct mail vehicle utilized by Donnelley Marketing in their Carol Wright program produces the highest redemption rate amongst the various delivery vehicles in use today, it is well recognized by those in the industry that a better method is essential in order to stem the increasing costs of this consumer promotional activity while simultaneously maintaining redemption which has been steadily declining since 1981. Obviously, the most efficient vehicle of coupon delivery would deliver coupons to only those who would use the coupons and who are also heavy product purchasers. Based on this proposition, attempts are now under way to devise a means for determining who these consumers are. One such attempt by Donnelley Marketing involved a limited test to simultaneously print a personal identification code number (PIN code) on the top-most coupon in the package of a Carol Wright mailing through a window opening in the envelope. In this manner, the redemption response of those receiving the coupon is measured and analyzed. A severe drawback to a system based on this test is the inability of the technology utilized to simultaneously print the envelopes and the top most coupon to expand beyond the coding of a single coupon. Thus, only a single coupon in a Carol Wright mailing of up to thirty seven coupons can be PIN coded. It would not be economically feasible to PIN code each and every coupon in a broad based Carol Wright mailing. Such an undertaking would require an equipment expenditure in the billions of dollars.

Another attempt is a recently introduced system by American Express which essentially utilizes a negotiable instrument bearing the advertiser's logo and payable to "any retailer distributing the product." Once the instrument is endorsed by the consumer, who is identified on the instrument, it is accepted at face value as partial payment for the product and then deposited by the retailer in his bank account for collection through the normal Federal Reserve clearing system. For a mailing list, American Express utilizes an existing credit list of individuals. This system has the disadvantage that it is extremely expensive since the instruments are treated as checks and therefore it is economically feasible for use only for big ticket consumer products (check processing fees are the same regardless of face value; i.e., ten cents to process a $100 check is quite efficient, whereas the same ten cents to process a twenty cent check is not). Also, since the instruments must pass through the Federal Reserve and conform to specified graphics, advertising is severely limited and two-sided printing or multicolor printing are not possible.

The latest attempt, introduced by Computer Promotions Corporation and termed the Coupon Connection, starts with a survey derived database of about thirty-two million households. Next, a profile of a product's heavy using or heavy redeeming household is developed in conjunction with the manufacturer and this is correlated with the database to derive a mailing list for the promotion of the particular product. Coupons are then printed with PIN (Personal Identification Number) Codes and mailed to the households on the mailing list. Upon redemption, a great deal of information can be gathered because of the coding of all coupons. Because of the necessity of encoding all coupons, this program is very expensive so that it cannot be broad based and so the coupon distribution must be pared down to those consumers which are specific to the manufacturer. Thus, although the redemption rate is relatively high, the actual numbers involved are very small so that the effect on the manufacturer's product movement may be inconsequential. Additionally, these coupons are still limited since they are also printed by means of check printing equipment, however, they are neither cleared nor restricted by the Federal Reserve.

SUMMARY OF THE INVENTION

It is, therefore, a primary object of the present invention to provide a system and methodology for economically and expeditiously identifying the heaviest product purchasers who regularly use coupons.

It is a further object of the present invention to provide a system and methodology which tracks and measures the actual redemption of coupons by these heaviest product purchasing and regular coupon using households so as to determine marketing information based on the consumer promotional behavior response patterns of these consumers and thus determine with a high degree of accuracy predictable consumer promotional behavior response patterns.

The above objects, as well as others which will hereinafter become apparent, are accomplished in accordance with the present invention by providing a system and methodology which initially involves the preparation of a list of names and addresses of consumers who are the most likely heaviest product purchasers who are regular coupon users and then delivering to them a plurality of purchase incentive offers such as cents-off coupons. The delivery of the coupons to the selected consumer households would also include at least one and preferably a plurality of consumer activated encoding devices each of which being designed to be attached to a coupon. The at least one consumer activated encoding device delivered to each consumer includes the name and address of the receiving consumer in machine readable language. Those purchase incentive offers having the attached encoding devices are received for redemption like other coupons, however, the names and addresses of the consumers submitting the encoded coupons received for redemption are read and recorded and a refined list of consumer names and addresses that actually redeem coupons is created from the initial prepared list of consumers.

By including machine readable data relative to the product, such as size, price, etc., on every delivered coupon and by periodically delivering additional purchase incentive offers and consumer activated encoding devices to the refined list of consumer names and addresses and analyzing the redemption characteristics of the various purchase incentive offers, consumer promotional behavior response patterns of heavy shopping households can be determined and thus consumer promotional behavior response patterns can be predicted with a high degree of accuracy.

Other objects and features of the present invention will become apparent from the following detailed description considered in connection with the accompanying drawings. It is to be understood that the drawings are designed as an illustration only and not as a definition of the limits of the invention.

BRIEF DESCRIPTION OF THE DRAWINGS

In the drawings, wherein similar reference characters denote similar elements throughout the several views.

DESCRIPTION OF THE PREFERRED EMBODIMENT

Figure 1:
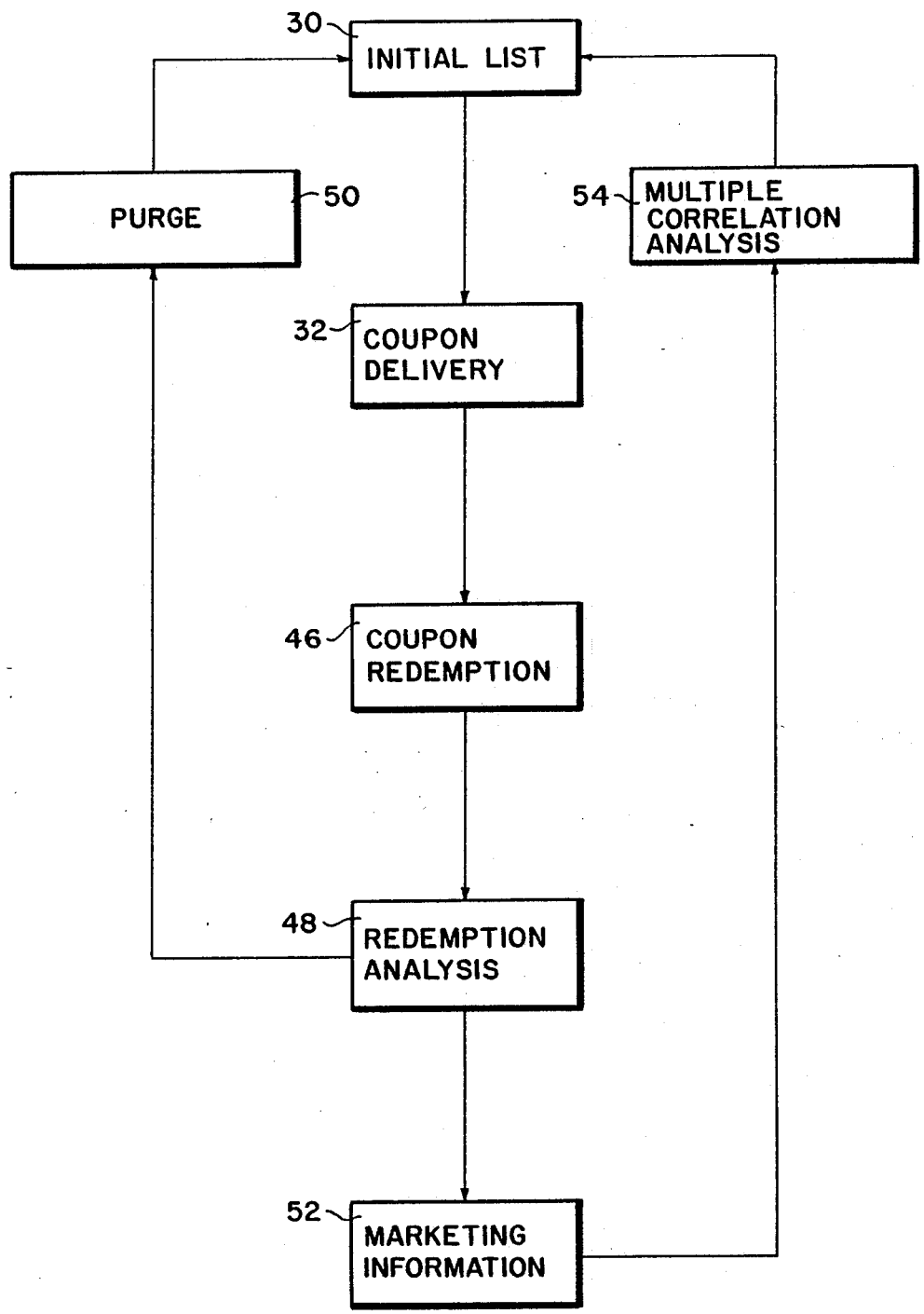
FIG. 1 is a schematic flow chart depicting the methodology and structure in accordance with the principles of the present invention for identifying the heaviest product purchasers who regularly use coupons and acquiring marketing information.

Referring to FIG. 1 of the drawings there is shown a system operational flow chart for implementing the methodology of the present invention for identifying the heaviest product purchasing and regular coupon using consumer households and acquiring marketing information relative to consumer promotional behavior. Although it is possible to utilize the inventive system and methodology by utilizing any initial listing or tabulation of consumers' names and addresses which would thereby be optimally refined and the optimal marketing information extracted based on this list, the results achieved are greatly improved the more likely the consumers on the initial list are heavy product purchasers as well as regular coupon users. Therefore, the inventive methodology further includes the development of an initial list of names and addresses of consumers who are most likely to be heavy product purchasers as well as regular coupon users. Thus, upon refinement and purging of this initial list, a list will result of the heaviest product purchasers that regularly use coupons.

Figure 2:
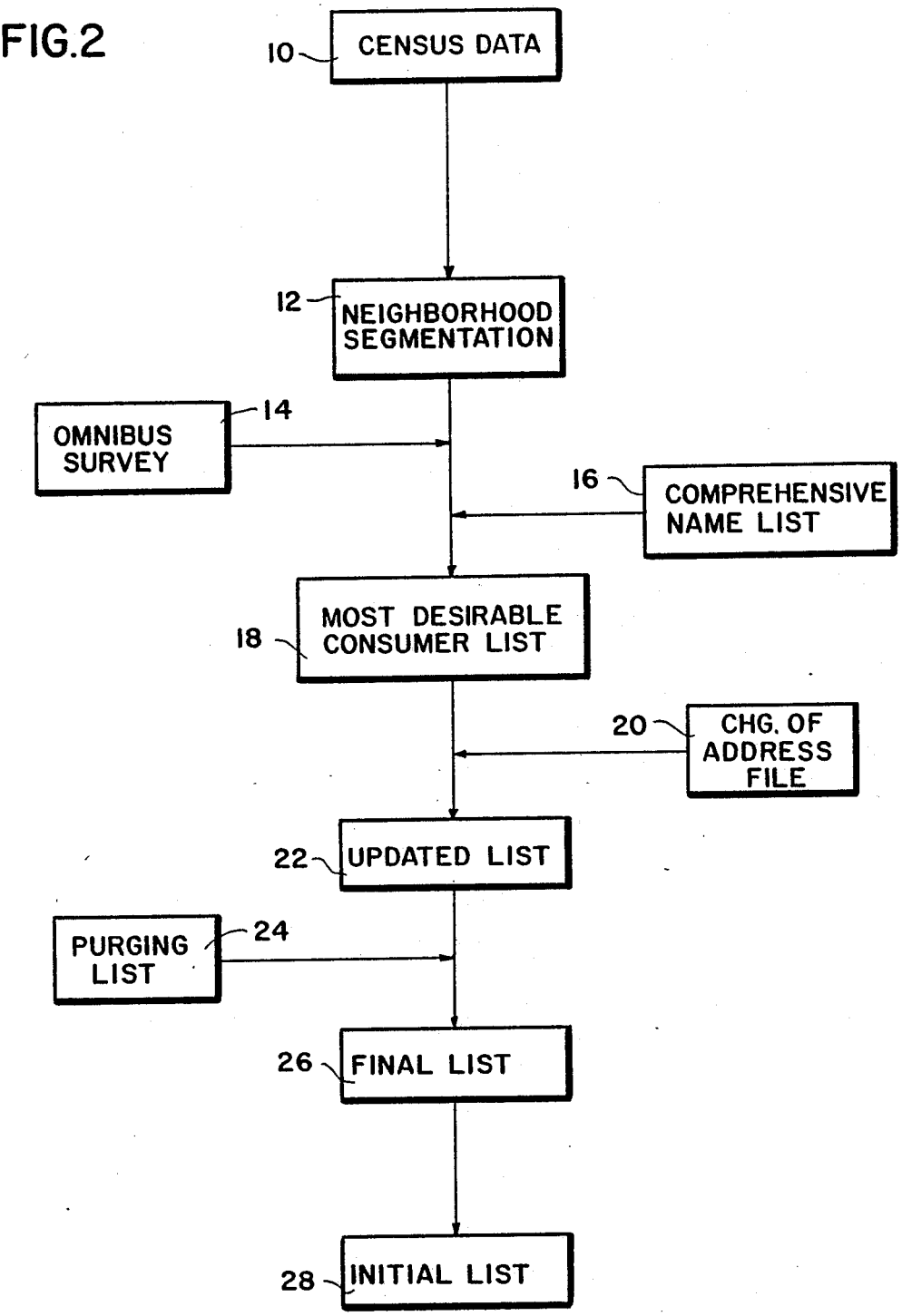
FIG. 2 is a schematic flow chart depicting the methodology and structure in accordance with the principles of the present invention for identifying the potentially heaviest product purchasers who regularly use coupons.

FIG. 2 shows an operational flow chart for implementing the methodology for the development of an initial list of names and addresses of the most likely heaviest product purchasers who regularly use coupons which is based on geo-demographic lifestyle segmentation. Simple demographic segmentation was developed after World War II and links heavy product usage to the middle class and is based on the key demographic characteristics, with income, profession, sex and age as the most common. However, in the ensuing years, the traditional middle class, and for that matter the entire U.S. society, has been reshaped by several influences so that at the present time, rather than a single homogeneous, identifiable group, there exists a wide variety of distinct lifestyles. Nevertheless, in the midst of this reorientation, what has remained homogeneous are lifestyles or patterns, including specific product purchase and usage patterns which are homogeneous to households that reflect a common psychographic make up. To define and then locate these lifestyles, the data accumulated by the U.S. Census is utilized. The U.S. Census collects data relative to about one thousand characteristics on every U.S. household. This data is shown in FIG. 2 as functional block 10. Obviously, a certain number of these characteristics will be common amongst all households and those households having approximately similar characteristics will have similar lifestyles. Furthermore, according to the U.S. Census, there are approximately 250,000 distinct neighborhoods in the U.S. which are homogeneous so that these neighborhoods can be correlated with the determined lifestyles to compartmentalize these neighborhoods into definable segments. This geodemographic analysis has, in fact, been accomplished by several firms, including Claritas with its Prizm system, CACI Inc. with its Acorn system, National Decision Systems, Inc. with its Vision system, etc. According to the NDS Vision system, 117 demographic, socioeconomic and housing characteristics are chosen and through multi-regression analysis about fifty homogeneous clusters or segments are developed and each of the 250,000 or so neighborhoods is assigned to one of the segments. This operation is identified as functional block 12 in FIG. 2.

In order to determine which of the approximately fifty clusters or segments would contain the most likely heaviest product purchasers who regularly use coupons, an ongoing omnibus consumer purchase and promotional behavior survey is conducted specifically measuring the frequency and dollar level of weekly grocery shopping patterns and relative usage level of cents-off coupons. The results of this survey ranks the clusters according to product purchase and coupon usage. This survey function is identified as functional block 14 in FIG. 2.

Next, a geo-coded list of consumer household names and addresses, block 16 in FIG. 2, is compared with the 250,000 or so neighborhoods so that each name and address on the list can be correlated or matched with a determined cluster or segment. The more comprehensive such a geo-coded list is, the more viable will be the result obtained by employing the methodology of the present invention. Such a comprehensive list is one compiled by R. L. Polk & Co. which lists approximately eighty million household names and addresses in the U.S.

Thus, psychographically the most desirable lifestyles and neighborhoods are identified and the appropriate names and addresses extracted by means of computer from the geo-coded list of consumer households. This list, identified as block 18, may then be continually updated by computer by utilizing the U.S. Postal Service's annual change-of-address file, which will detect and remove residential neighborhoods lost to rezoning and renewal, add new residential neighborhoods created from rezoning, and update the list itself. This function is identified by functional block 20 to result in the updated list of block 22. Thereafter, the list can be purged of certain types of households considered, from a marketing viewpoint, as less desirable, such as retirees. This can be accomplished through the computer application of existing lists of such households and the function is identified by functional block 24 in FIG. 2. The final list derived by this process is identified by block 26.

An initial mailing list, designated 28, of twenty million is compiled from the purged most desirable lifestyles and neighborhoods of final list 26. The number twenty million is determined empirically based on several indicia, such as the fact that there are eighteen million households with two plus children under eighteen, the initial mailings of the first successful direct mailing of coupons was to seventeen million households, and finally the forty-seven million circulation of free standing inserts in the Sunday papers is too great given the net redemption of 3.6%.

Figure 3:
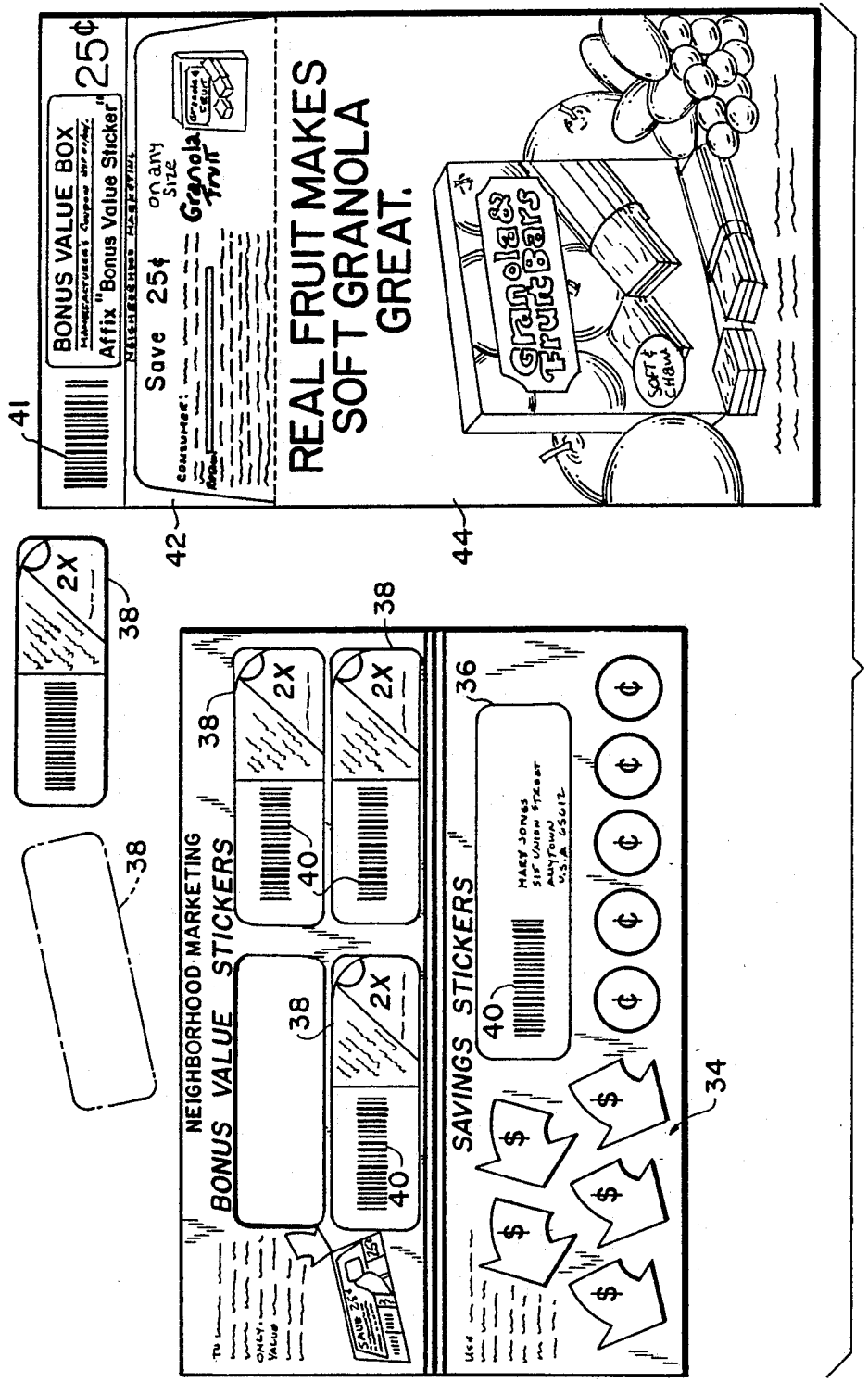
FIG. 3 is a plan view of a coupon together with the consumer activated encoding mechanism used therewith.

Tracking actual consumer response, particularly coupon redemption, requires encoding the coupon itself so as to identify the consumer. The financial expenditure for the necessary equipment to encode all coupons in a broad based direct mail coupon system would be prohibitive. However, by utilizing a consumer activated encoding device or mechanism, there is obtained a selective coding which is coextensive with actual coupon redemption. Thus, as seen in FIG. 1, a plurality of purchase incentive offers, such as coupons, are delivered preferably by mail to the consumer households of the compiled initial list 30, which is preferably identical to the list 28 derived by the methodology described above in connection with FIG. 2. This delivery is identified by functional block 32 in FIG. 1. Along with the coupons addressed and delivered to each household is at least one and preferably several, but less than the number of coupons, consumer activated encoding devices, each of which when attached to a coupon identifies the consumer who redeems the coupon. This may be done, as seen in FIG. 3, by providing in the package a separate sheet 34 possibly having the mailing label 36 thereon, which is viewable through a window in the mailing envelope, and on which are a plurality of removable stickers 38 having a machine readable PIN code 40 thereon, such as a bar code with an alphanumeric back-up, and which can be attached by means of pressure sensitive adhesive to a coupon 42 forming part of a consumer promotional advertisement 44. Coupon 42 can also be coded, such as by means of a bar code with an alphanumeric back-up, designated 41, with product and coupon information so that a full analysis of the redemption can be made. Obviously, it is necessary to give the consumer some incentive for performing this function. This incentive may take the form of enhancing the value of the coupon to which the code bearing sticker is applied or possibly activating or giving value to the coupon when applied thereto. Of course, the sticker sheet will include instructions to the consumer on how to properly utilize the removable stickers in combination with the appropriate coupons or other consumer purchase incentives. Preferably, it is believed that there should be a small number of encoding device-coupon enhancing stickers relative to the number of coupons so as not to cheapen the value of the stickers to the consumer. This perceived value for these stickers will prevent consumers from trading them with other consumers as is now frequently done with normal cents-off coupons.

It can, of course, be appreciated that when a consumer redeems a coupon, as indicated by functional block 46 in FIG. 1, bearing the consumer activated encoding device in the form of the code bearing sticker, that consumer is fully identified by name, address, his or her neighborhood and lifestyle affiliation. Thus, by analyzing these redemptions, functional block 48, those consumers on initial mailing list 30 who do not redeem coupons or an insufficient number of coupons can be purged from the list, functional block 50, leaving only those consumer households which are the heaviest product purchasers who regularly use coupons. It can also be appreciated that with a number of mailings and proper coding of the individual coupons with product and value information, all informational aspects of a particular redemption become known, including the consumer's identity, his or her specific product preference and redemption frequency, face value elasticity of coupons, and others. Thus, over successive mailings of such coupon packages with consumer activated encoding devices, marketing information, functional block 52, can be derived from which predictable promotional consumer behavior patterns can be determined.

It is also possible by utilizing the accumulated marketing information and coupon users, to correlate an individual program or mailing. Thus, a multiple correlation analysis for coincident usage may be made once the participating products and product categories are known for a coupon mailing. This involves a cross comparison of specific user groups for participating different products so as to determine common consumer and household audiences so that a particular mailing may be tailored for the products involved. This function is identified by functional block 54 in FIG. 1 and is performed by an appropriate computer program.

Figure 4:
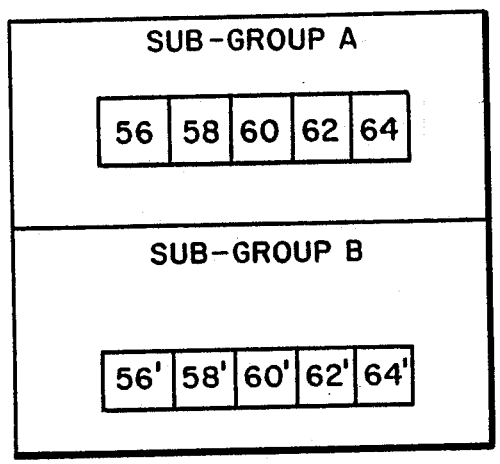
FIG. 4 is a schematic representation of a delivery methodology which can be used to implement the present invention and which provides additional marketing information relative to consumer promotional behavior response patterns.

Another aspect of the present invention incorporates a system into the above-described methodology which results in an extensive, behavioral based, continuous consumer research laboratory. Thus, as seen in FIG. 4, the twenty million household initial mailing list is divided on an alternate name-address basis into two sub-groups of ten million each. Hence, between two adjacent households, one will be in sub-group A and the other in sub-group B. Each sub-group A and B is then further split into five equally dispersed or distributed cells of two million each and designated 56, 58, 60, 62, 64 and 56', 58', 60', 62', 64', respectively. In the first mailing to the twenty million households, each household in sub-group A will receive its coupon package including the sticker sheet containing the coupon enhancing consumer activated encoding devices in the form of stickers while each household in sub-group B will receive a package with regular coupons and without the sticker sheet. Thus, sub-group B which does not receive the sticker sheets and thus any means of enhancing the value of their coupons, acts as a control group against which the effect of the enhanced values of the coupons redeemed by the consumers in sub-group A can be measured. In the next mailing, the households in sub-group B receive the sticker sheets while the households in sub-group A do not. In the third and subsequent mailings, this alternating or oscillating sequence between sub-groups A and B continues, but the cells will commence rotation. Thus, in the third mailing, cells 58, 60, 62 and 64 of sub-group A and cell 56' of sub-group B receive the sticker sheet and in the fourth mailing cells 58', 60' 62' and 64' of sub-group B and cell 56 of sub-group A receive sticker sheets. In the fifth mailing, cells 60, 62 and 64 of sub-group A and cells 56' and 58' of sub-group B receive sticker sheets. This rotation system continues so that with every tenth mailing, the entire mailing list has been rotated through.

It is to be understood that the foregoing general and detailed descriptions are explanatory of the present invention and are not to be interpreted as restrictive of the following claims.

What is claimed is:

1. A system for identifying by name and address those consumers who redeem redeemable product purchase incentives such as cents off coupons, said system comprising:
   (a) preparing an initial list of names and addresses of consumers who are to receive redeemable product purchase incentives;
   (b) delivering to those consumers on said initial list a plurality of redeemable product purchase incentives in a unit on a plurality of consumer products with at least one consumer activated encoding device indicating the name and address of the receiving consumer in machine readable language, each of said at least one consumer activated encoding device being adapted for physical association with a product purchase incentive;
   (c) receiving for redemption from receiving consumers those product purchase incentives submitted for redemption including those product purchase incentives physically associated with said consumer activated encoding devices;
   (d) machine reading and recording the names and addresses of receiving consumers that redeem the redeemable product purchase incentives physically associated with said consumer activated encoding devices; and
   (e) recreating out of said initial list a list of names and addresses of receiving consumers that actually redeem redeemable product purchase incentives.

2. The system as defined in claim 1, wherein the number of redeemable product purchase incentives delivered in a unit to each consumer is greater than the number of consumer activated encoding devices in said unit.

3. The system as defined in claim 1, wherein the step of delivering to those consumers on said initial list a plurality of redeemable product purchase incentives in a unit comprises mailing the units of product purchase incentives to the names and addresses of consumers on said initial list.

4. The system as defined in claim 1, which further comprises the step of providing an incentive to the receiving consumer to physically associate said at least one consumer activated encoding device received by said consumer with a redeemable product purchase incentive.

5. The system as defined in claim 4, wherein the step of providing an incentive to the receiving consumer comprises indicating on said consumer activated encoding device a value multiplier of the redeemable product purchase incentive when the consumer activated encoding device is physically associated with a redeemable product purchase incentive.

6. A system for identifying by name and address those consumers who are the heaviest product purchasers who regularly use cents-off coupons, said system comprising:
   (a) preparing an initial list of names and addresses of consumers who are the most likely heaviest product purchasers who are regular cents-off coupon users;
   (b) delivering to those consumers on said initial list a plurality of redeemable cents-off coupons in a unit on a plurality of consumer products with at least one consumer activated encoding device indicating the name and address of the receiving consumer in machine readable language, each of said at least one consumer activated encoding device being adapted for physical association with a cents-off coupon;
   (c) receiving for redemption from receiving consumers those cents-off coupons submitted for redemption including those physically associated with said consumer activated encoding devices;
   (d) machine reading and recording the names and addresses of receiving consumers that redeem the cents-off coupons physically associated with said consumer activated encoding devices; and (e) recreating out of said initial list a list of names and addresses of the heaviest product purchasers who regularly use cents-off coupons.

7. The system as defined in claim 6, wherein the number of redeemable cents-off coupons delivered in a unit to each consumer is greater than the number of consumer activated encoding devices in said unit.

8. The system as defined in claim 6, wherein the step of delivering to those consumers on said initial list a plurality of redeemable cents-off coupons in a unit comprises mailing the units of cents-off coupons to the names and addresses of consumers on said initial list.

9. The system as defined in claim 6, which further comprises the step of providing an incentive to the receiving consumer to physically associate said at least one consumer activated encoding device received by said consumer with a redeemable cents-off coupon.

10. The system as defined in claim 9, wherein the step of providing an incentive to the receiving consumer comprises indicating on said consumer activated encoding device a value multiplier of the redeemable cents-off coupon when the consumer activated encoding device is physically associated with a redeemable cents-off coupon.

11. The system as defined in claim 6, which further comprises dividing said initial list into two equal groups on an alternate name-address basis and performing steps b to e on a first group and delivering regular coupons to a second group.

12. The system as defined in claim 6, wherein the step of preparing an initial list of names and addresses of consumers who are the most likely heaviest product purchasers who are regular cents-off coupon users comprises:

(a) geo-demographically analyzing the U.S. population utilizing U.S. Census data in order to segment all U.S. neighborhoods into homogeneous categories;

(b) determining by means of an omnibus survey which of said homogeneous categories contain heavy product purchasers who regularly use cents-off coupons;

(c) correlating a comprehensive geo-coded list of U.S. consumer household names and addresses with the homogeneously categorized neighborhoods to derive consumer names and addresses corresponding to the categorized neighborhoods; and (d) selecting those categorized neighborhoods which have been determined to include heavy product purchasers who regularly use cents-off coupons to derive a list of names and addresses of consumers who are the most likely heaviest product purchasers who are regular cents-off coupon users.

13. The system as defined in claim 12, which further includes the step of continually updating said prepared initial list of names and addresses by comparing the U.S. Postal Service's annual change-of-address file to said list.

14. The system as defined in claim 12, which further includes the step of purging said initial list of names and addresses of those who do not demographically fit the homogeneous set of the selected categorized neighborhoods by comparing a list of such consumers with the initial list.

15. The system as defined in claim 12, wherein said list of consumers who do not fit the homogeneous set of the selected categorized neighborhoods is a list of retirees.

16. A system for determining with a high degree of accuracy predictable consumer promotional behavior response patterns of heavy product purchasers who regularly use cents-off coupons, said system comprising:

(a) preparing an initial list of names and addresses of consumers who are the most likely heaviest product purchasers who are regular cents-off coupon users;

(b) delivering to those consumers on said initial list a plurality of redeemable cents-off coupons in a unit on a plurality of consumer products with at least one consumer activated encoding device indicating the name and address of the receiving consumer in machine readable language, each coupon having machine readable information thereon relating to product, value and product size, and each of said at least one consumer activated encoding device being adapted for physical association with a cents-off coupon;

(c) receiving for redemption from receiving consumers those cents-off coupons submitted for redemption including those physically associated with said consumer activated encoding devices;

(d) machine reading and recording the names and addresses of receiving consumers that redeem the cents-off coupons physically associated with said consumer activated encoding devices and reading and recording the machine readable information on said cents-off coupons;

(e) recreating out of said initial list a list of names and addresses of the heaviest product purchasers who regularly use cents-off coupons, by eliminating from said initial list the names and addresses of those who do not redeem coupons which are physically associated with said consumer activated encoding devices;

(f) repeating steps b to c utilizing the recreated list in place of the initial list at least once to form a database; and (g) analyzing said database to determine individual consumer's redemption frequency, specific product preference and coupon face value elasticity so as to determine promotional behavior response patterns of heavy product purchasers who regularly use cents-off coupons and thus predict such patterns with a high degree of accuracy.

17. The system as defined in claim 16, which further comprises dividing said initial list into two equal groups on an alternate name-address basis and performing steps b to f on a first group and delivering regular coupons to a second group and alternating this sequence with each delivery program.

18. The system as defined in claim 17, wherein said first and second groups are further subdivided into a plurality of equal cells and subsequent to a second delivery program the delivery of regular coupons among the various cells is rotated among all the cells.

19. The system as defined in claim 16, wherein the number of redeemedable cents-off coupons delivered in a unit to each consumer is greater than the number of consumer activated encoding devices in said unit.

20. The system as defined in claim 16, wherein the step of delivering to those consumers on said initial list a plurality of redeemable cents-off coupons in a unit comprises mailing the units of cents-off coupons to the names and addresses of consumers on said initial list.

21. The system as defined in claim 16, which further comprises the step of providing an incentive to the receiving consumer to physically associate said at least one consumer activated encoding device received by said consumer with a redeemable cents-off coupon.

22. The system as defined in claim 16, wherein the step of providing an incentive to the receiving consumer comprises indicating on said consumer activated encoding device a value multiplier of the redeemable cents-off coupon when the consumer activated encoding device is physically associated with a redeemable cents-off coupon.

23. The system as defined in claim 16, wherein the step of preparing an initial list of names and addresses of consumers who are the most likely heaviest product purchasers who are regular cents-off coupon users comprises:
    (a) geo-demographically analyzing the U.S. population utilizing U.S. Census data in order to segment all U.S. neighborhoods into homogeneous categories;
    (b) determining by means of an omnibus survey which of said homogeneous categories contain heavy product purchasers who regularly use cents-off coupons;
    (c) correlating a comprehensive geo-coded list of U.S. consumer household names and addresses with the homogeneously categorized neighborhoods to derive consumer names and addresses corresponding to the categorized neighborhoods; and
    (d) selecting those categorized neighborhoods which have been determined to include heavy product purchasers who regularly use cents-off coupons to derive a list of names and addresses of consumers who are the most likely heaviest product purchasers who are regular cents-off coupon users.

24. The system as defined in claim 23, which further includes the step of continually updating said prepared initial list of names and addresses by comparing the U.S. Postal Service's annual change-of-address file to said list.

25. The system as defined in claim 23, which further includes the step of purging said initial list of names and addresses of those who do not demographically fit the homogeneous set of the selected categorized neighborhoods by comparing a list of such consumers with the initial list.

26. The system as defined in claim 25, wherein said list of consumers who do not fit the homogeneous set of the selected categorized neighborhoods is a list of retirees.

* * * * *